United States Patent
Inoue et al.

(10) Patent No.: US 7,740,969 B2
(45) Date of Patent: Jun. 22, 2010

(54) SEPARATOR FOR FUEL BATTERY

(75) Inventors: Tomohiro Inoue, Fujisawa (JP);
Shigeru Watanabe, Fujisawa (JP);
Tetsuya Urakawa, Fujisawa (JP)

(73) Assignee: NOK Corporation, Tokyo (JP)

( * ) Notice: Subject to any disclaimer, the term of this patent is extended or adjusted under 35 U.S.C. 154(b) by 766 days.

(21) Appl. No.: 10/557,824

(22) PCT Filed: Jul. 8, 2004

(86) PCT No.: PCT/JP2004/009717
§ 371 (c)(1),
(2), (4) Date: Nov. 23, 2005

(87) PCT Pub. No.: WO2005/004264
PCT Pub. Date: Jan. 13, 2005

(65) Prior Publication Data
US 2006/0269818 A1    Nov. 30, 2006

(30) Foreign Application Priority Data
Jul. 8, 2003    (JP)    ............................. 2003-271840

(51) Int. Cl.
*H01M 2/00* (2006.01)
*H01M 2/08* (2006.01)

(52) U.S. Cl. .............................. 429/34; 429/35; 429/36; 429/38

(58) Field of Classification Search ...................... None
See application file for complete search history.

(56) References Cited

U.S. PATENT DOCUMENTS

| 6,337,120 B1 * | 1/2002 | Sasaki et al. ................ 428/66.4 |
| 6,686,083 B1 * | 2/2004 | Saito et al. .................... 429/34 |
| 7,063,911 B1 * | 6/2006 | Nagai et al. ................... 429/35 |

FOREIGN PATENT DOCUMENTS

| JP | 8-200503 | 8/1996 |
| JP | 8-507403 | 8/1996 |
| JP | 2000-356267 | 12/2000 |
| JP | 2001-185174 | 7/2001 |

(Continued)

OTHER PUBLICATIONS

Online translation of JP 2001-332275, Inoue, Nov. 30, 2001.*

(Continued)

*Primary Examiner*—Dah-Wei D Yuan
*Assistant Examiner*—Kwang Han
(74) *Attorney, Agent, or Firm*—Jacobson Holman PLLC (57) ABSTRACT

To provide a separator for a fuel battery in which a gasket is integrally formed with rubber in gasket forming grooves provided in a separator main body without the gasket forming grooves being damaged at a time of forming with the rubber and sealing performance being lowered due to the damage of the separator, the separator for the fuel battery is structured such that a groove width of the gasket forming groove formed in one surface of the separator main body is made larger than a groove width of the gasket forming groove formed in the other surface, or groove side surfaces in the gasket forming groove are formed in an inclined shape, or a curvature is provided in corner portions of a groove bottom surface.

2 Claims, 6 Drawing Sheets

FOREIGN PATENT DOCUMENTS

| | | |
|---|---|---|
| JP | 2001-332275 | 11/2001 |
| JP | 2002-042837 | 2/2002 |
| JP | 2002-050369 | 2/2002 |
| JP | 2002-081543 | 3/2002 |
| JP | 2003-083165 | 3/2003 |
| WO | WO94/09520 | 4/1994 |

OTHER PUBLICATIONS

Online translation of JP 2000-356267, Ishigaki et al., Dec. 26, 2000.*

* cited by examiner

SEPARATOR FOR FUEL BATTERY

This is a nationalization of PCT application of International Publication No. WO 2005/004264 published on Jan. 13, 2005 and published in Japanese.

TECHNICAL FIELD

The present invention relates to a separator for a fuel battery.

BACKGROUND ART

A proton-exchange membrane fuel battery is a battery generating electric power by using a principle of gaining electricity in the process of reacting hydrogen with oxygen (an air) so as to obtain water. The fuel battery is constituted by a fuel battery stack in which a cell is formed by an electrolyte membrane transmitting hydrogen ions and two separators between which the electrolyte membrane is inserted and a plurality of the cells are layered. In this case, a function of shielding the hydrogen and the oxygen, and conductivity capable of gaining the electricity are required in the separator forming the cell.

Further, since the hydrogen, the oxygen and cooling water are used within the stack, a gasket for sealing them is assembled together. However, since a considerable man-hour is required for assembling the gasket within the stack after the gasket having been independently formed, a method of integrally forming the gasket in a separator main body has been proposed, and there has been also proposed a method of forming a gasket forming groove on a surface of a separator main body for preventing a gasket lip from being displaced due to an internal pressure and forming a through hole within the gasket forming groove, thereby fixing the gasket to both the surfaces of the separator main body on the basis of an anchor effect of the through hole, for example, in the invention described in Japanese Unexamined Patent Publication No. 2001-185174.

On the other hand, a material of the gasket conventionally employed is silicone rubber corresponding to liquid rubber having low viscosity, however, there have been generated problems such as transmission of hydrogen, precipitation of silicone, swelling of silicone rubber and the like. As a countermeasure thereof, it has been proposed, by the invention described in Japanese Unexamined Patent Publication No. 2002-50369, that EPDM or fluorine-contained rubber corresponding a compound type rubber having high viscosity is used in place of the silicone rubber.

Figure 10:
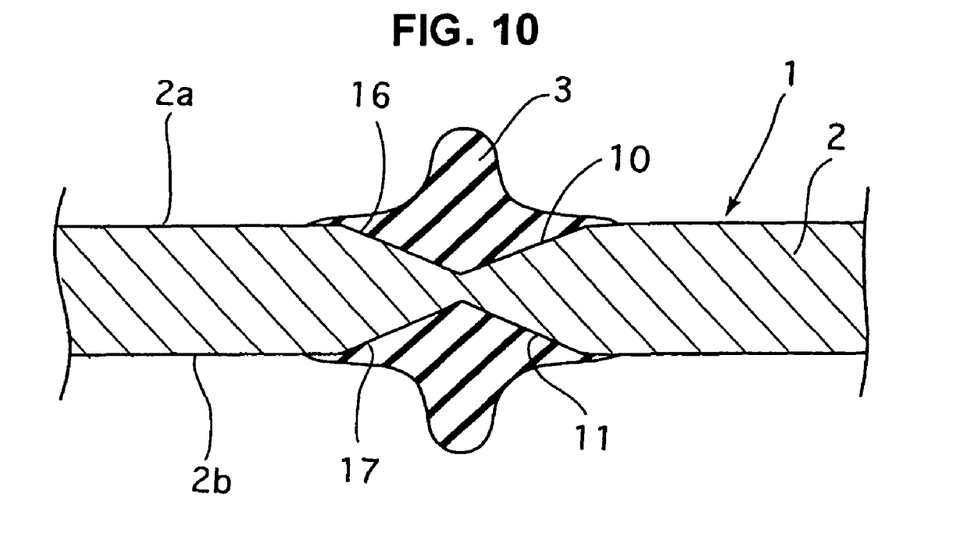
FIG. 10 is a cross sectional view of a main portion of a separator for a fuel battery in accordance with an eighth embodiment of the present invention.

However, in the case that the gasket is integrally formed in the separator main body, the silicone rubber can be formed at low injection pressure and gives no damage to the separator due to the low viscosity in the liquid phase of the silicone rubber. However, in the case of using the EPDM or the fluorine-contained rubber is used, high injection pressure is required due to the high viscosity, so that as shown in FIG. 10, there are generated a problem that a bottom surface 10a or 11a of the gasket forming groove is punched out by the rubber pressure, and a problem that a groove bottom surface corner portion 14 is punched out by the rubber pressure in a portion in which a side surface strength of the gasket forming groove is low, whereby a damage portion 15 is generated. Accordingly, there has been a problem that a sealing performance is deteriorated due to the damage of the separator main body.

Further, when the separator main body is made thinner for making the fuel battery compact in size and light in weight, there has been a problem that a bottom surface of the forming groove and a corner portion of the groove bottom surface are damaged at a time of forming with the liquid rubber or the like under low injecting pressure. Further, even in the gasket forming groove having the structure in which the through hole is not provided, when a groove such as a forming groove, an adhesion groove or the like is formed in the back of the gasket forming groove, a stress is concentrated, so that there is a problem that the bottom surface of the gasket forming groove is damaged.

Patent Document 1: Japanese Unexamined Patent Publication No. 2001-185174
Patent Document 2: Japanese Unexamined Patent Publication No. 2002-050369

DISCLOSURE OF THE INVENTION

Problem to be Solved by the Invention

The present invention is made by taking the points mentioned above into consideration, and an object of the present invention is to provide a separator for a fuel battery in which a gasket is integrally formed in both surfaces of a separator main body by arranging a through hole in gasket forming grooves provided in the separator main body and forming is made with rubber, and in which the gasket forming groove portion can be prohibited from being damaged without a problem that a bottom surface of the gasket forming groove is punched out by a pressure of the rubber, and a problem that a corner portion of a groove bottom surface in a portion having a low side surface strength in the gasket forming groove is punched out by the pressure of the rubber, even in the case of being formed at a high injection pressure for using high viscosity type EPDM or fluorine-contained rubber for a material of the gasket, whereby it is possible to prevent a sealing performance from being lowered on the basis of a damage of the separator.

Further, an object of the present invention is to provide a separator for a fuel battery having a gasket forming groove in which a bottom surface of the forming groove and a corner portion of the groove bottom surface are not damaged by the pressure of the liquid rubber or the like even at a time of forming with the liquid rubber or the like at the low injection pressure, in the forming groove having the through hole formed in the separator main body which becomes thinner on the basis of the size reduction and the weight reduction of the fuel battery.

Further, an object of the present invention is to provide a separator for a fuel battery having a gasket forming groove in which a bottom surface of the forming groove is not damaged by the pressure of the rubber or the like at a time of injection molding with the rubber or the like in the forming groove having no through hole and having the groove formed on the back in the separator main body in which the grooves are formed in both surfaces.

Means for Solving the Problem

In order to achieve the objects mentioned above, in accordance with a first aspect of the present invention, there is provided a separator for a fuel battery in which a through hole is provided in gasket forming grooves provided in a separator main body and forming is made with rubber, whereby a gasket is integrally formed in both surfaces of the separator main body, wherein a groove width of the gasket forming groove formed in one surface of the separator main body is made wider than a groove width of the gasket forming groove formed in the other surface.

Further, in accordance with a second aspect of the present invention, there is provided a separator for a fuel battery in which a through hole is provided in gasket forming grooves provided in a separator main body and forming is made with rubber, whereby a gasket is integrally formed in both surfaces of the separator main body, wherein groove side surfaces in the gasket forming grooves formed in the separator main body are formed in an inclined shape.

Further, in accordance with a third aspect of the present invention, there is provided a separator for a fuel battery in which a through hole is provided in a gasket forming groove provided in a separator main body and forming is made with rubber, whereby a gasket is integrally formed in both surfaces of the separator main body, wherein a curvature is provided in corner portions of groove bottom surfaces in the gasket forming grooves formed in the separator main body.

Further, in accordance with a fourth aspect of the present invention, there is provided a separator for a fuel battery in which forming is made with rubber in a gasket forming groove formed in at least one of surfaces of a separator main body having grooves formed in both surfaces, whereby a gasket is formed in the separator main body, wherein a groove width of the gasket forming groove formed in one surface of the separator main body is made wider than a groove width of the groove formed in the other surface being the back of the gasket forming groove.

Further, in accordance with a fifth aspect of the present invention, there is provided a separator for a fuel battery in which forming is made with rubber in a gasket forming groove formed in at least one of surfaces of a separator main body having grooves formed in both surfaces, whereby a gasket is formed in the separator main body, wherein groove side surfaces in the gasket forming groove formed in one surface of the separator main body and in the groove formed in the other surface being the back of the gasket forming groove are formed in an inclined shape.

Further, in accordance with a sixth aspect of the present invention, there is provided a separator for a fuel battery in which forming is made with rubber in a gasket forming groove formed in at least one of surfaces of a separator main body having grooves formed in both surfaces, whereby a gasket is formed in the separator main body, wherein a curvature is provided in corner portions of groove bottom surfaces in the gasket forming groove formed in one surface of the separator main body and in the groove formed in the other surface being the back of the gasket forming groove.

In accordance with the separator for the fuel battery on the basis of the first to third aspects of the present invention provided with the structure mentioned above, since the groove width of the gasket forming groove formed in one surface is made larger than the groove width of the gasket forming groove formed on the other surface, or the groove side surface of the gasket forming groove is formed in the inclined shape, or the curvature is provided in the corner portion of the groove bottom surface, it is possible to prevent the problem that the bottom surface of the gasket forming groove is punched out by the pressure of the rubber even in the case of being formed under the high injection pressure by using the high viscosity compound type EPDM, fluorine-contained rubber or the like. Further, it is possible to prevent the problem that the corner portion of the groove bottom surface in the portion having the low side surface strength in the gasket forming groove is punched out by the pressure of the rubber.

Further, in accordance with the separator for the fuel battery on the basis of the first to third aspects of the present invention provided with the structure mentioned above, it is possible to prevent the problem that the bottom surface of the gasket forming groove is punched out by the pressure of the rubber even in the case that the separator main body is made thinner on the basis of the reduction in size and the reduction in weight of the fuel battery and injection molding is made with the liquid rubber under the low output. Further, it is possible to prevent the problem that the corner portion of the groove bottom surface in the portion having the low side surface strength in the gasket forming groove is punched out by the pressure of the rubber.

Further, in accordance with the separator for the fuel battery on the basis of the fourth to sixth aspects of the present invention provided with the structure mentioned above, since the groove width of the gasket forming groove formed in one surface of the separator main body is made larger than the groove width of the groove formed in the other surface being the back of the forming groove, or the groove side surface of the gasket forming groove and the groove formed in the back surface of the gasket forming groove is formed in the inclined shape, or the curvature is provided in the corner portion of the groove bottom surface, it is possible to prevent the problem that the bottom surface of the gasket forming groove is punched out by the pressure of the rubber even in the case that injection molding is made with the rubber or the like in the gasket forming groove from being generated.

EFFECT OF THE INVENTION

In the separator for the fuel battery in accordance with the first to third aspects of the present invention provided with the structure mentioned above, since it is possible to prevent the problem that the bottom surface of the gasket forming groove is punched out by the pressure of the rubber even in the case of being formed under the high injection pressure by using the high viscosity compound type EPDM, fluorine-contained rubber or the like and the problem that the corner portion of the groove bottom surface in the portion having the low side surface strength in the gasket forming groove is punched out by the pressure of the rubber, it is possible to inhibit the gasket forming groove from being damaged, whereby it is possible to prevent the sealing performance from being lowered due to the damage of the separator.

Further, in the separator for the fuel battery in accordance with the first to third aspects of the present invention provided with the structure mentioned above, since it is possible to prevent the problem that the bottom surface of the gasket forming groove is punched out by the pressure of the rubber even in the case that the separator main body is made thinner on the basis of the reduction in size and the reduction in weight of the fuel battery and injection molding is made with the liquid rubber under the low output, and the problem that the corner portion of the groove bottom surface in the portion having the low side surface strength in the gasket forming groove is punched out by the pressure of the rubber, it is possible to inhibit the gasket forming groove from being damaged, whereby it is possible to prevent the sealing performance from being lowered due to the damage of the separator.

Further, in the separator for the fuel battery in accordance with the fourth to sixth aspects of the present invention provided with the structure mentioned above, since it is possible to prevent the problem that the bottom surface of the gasket forming groove is punched out by the pressure of the rubber even in the case that injection molding is made with the rubber or the like in the gasket forming groove from being generated, it is possible to inhibit the gasket forming groove from being damaged, whereby it is possible to prevent the sealing performance from being lowered due to the damage of the separator.

DESCRIPTION OF REFERENCE NUMERAL 1 separator for fuel battery
2 separator main body
2a, 2b surface of separator main body
3 gasket
4 through hole
5, 7 pedestal portion
6, 8 lip portion
9 connection portion
10, 11 forming groove
10a, 11a groove bottom surface portion
12, 13 buried portion
14 corner portion of groove bottom surface
15 damaged portion
16, 17 groove side surface

BEST MODE FOR CARRYING OUT THE INVENTION

A description will be given below of preferable embodiments in accordance with the invention with reference to the accompanying drawings. In this case, the scope of the invention is not limited to the contents described in the embodiments unless being particularly described.

First Embodiment

Figure 1:
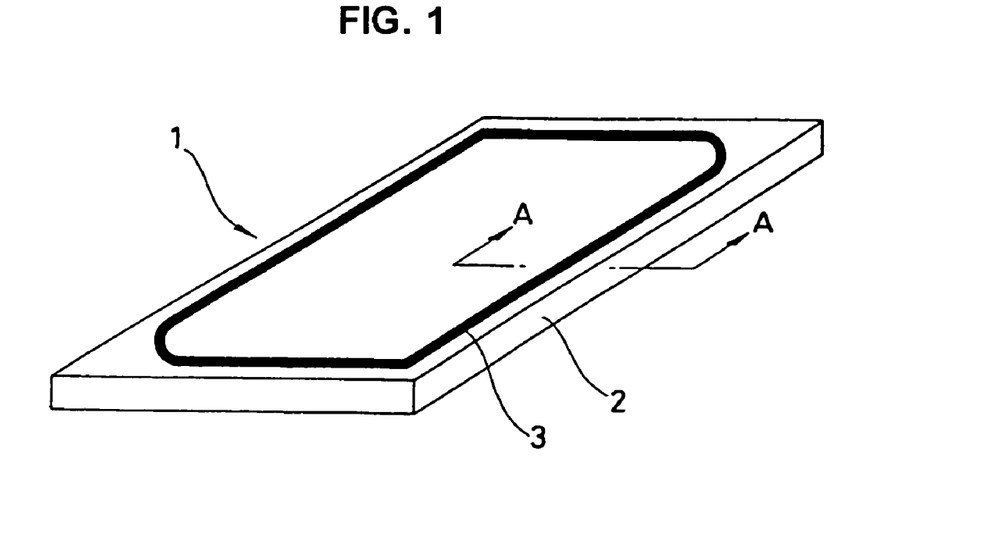
FIG. 1 is a schematic view of a separator for a fuel battery in accordance with an embodiment of the present invention.
Figure 2:
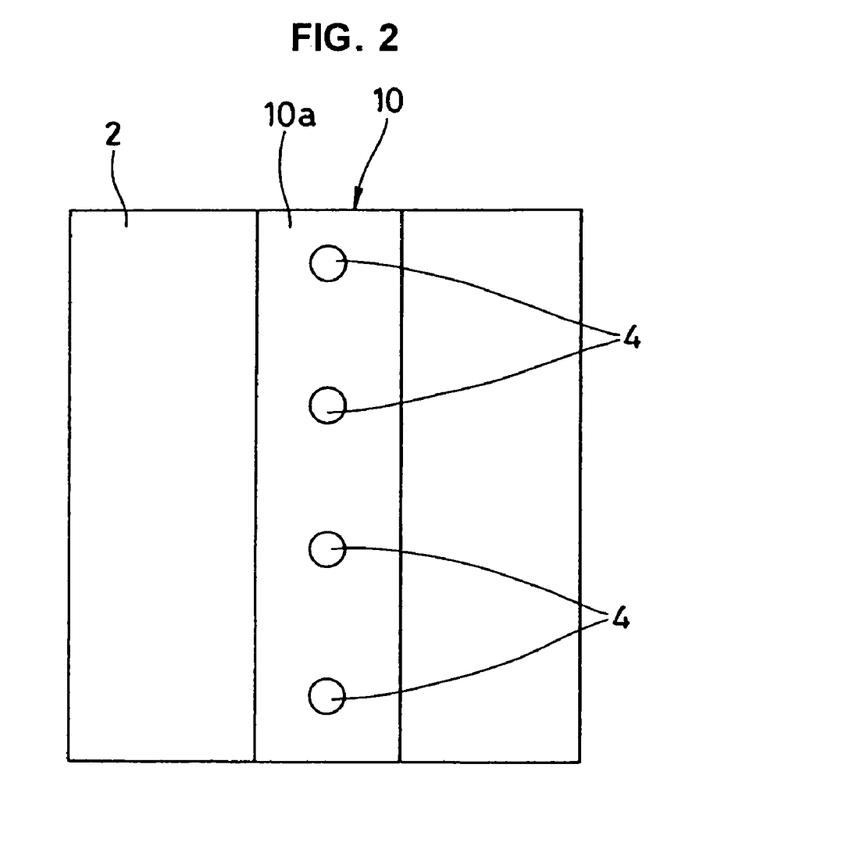
FIG. 2 is a partial plan view of a separator main body structuring the separator for the fuel battery in accordance with the embodiment of the present invention.
Figure 3:
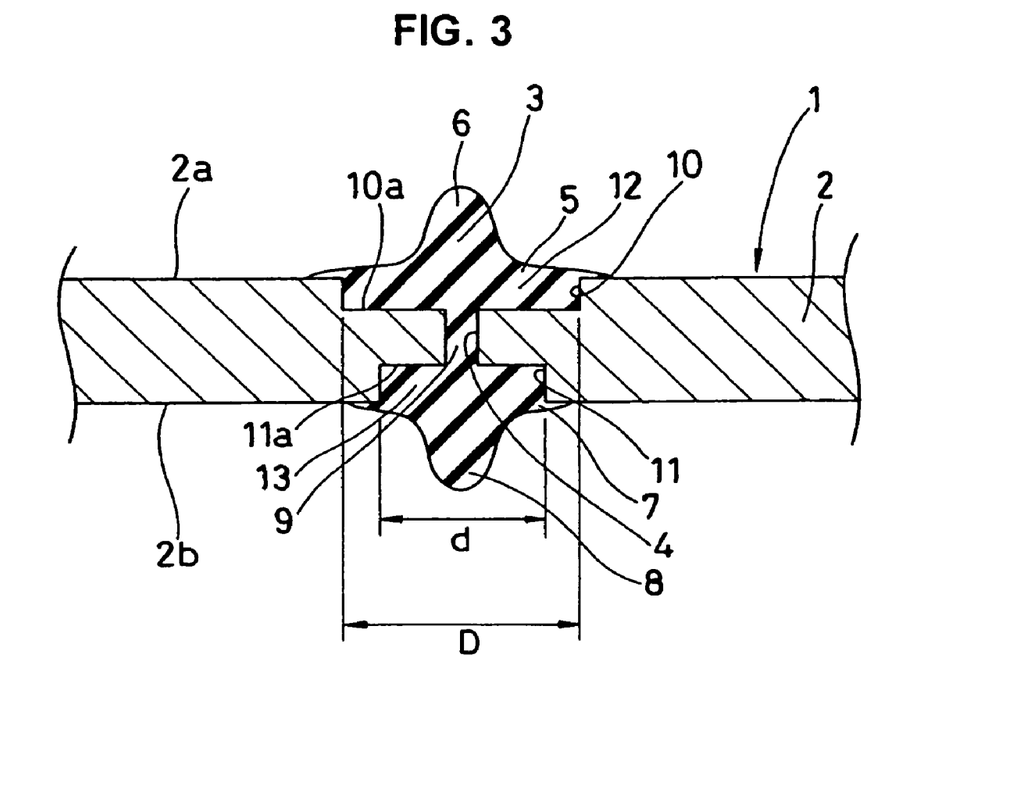
FIG. 3 is a cross sectional view of a main portion of a separator for a fuel battery in accordance with a first embodiment of the present invention.

FIG. 1 is a schematic view of a separator 1 for a fuel battery in accordance with a first embodiment of the present invention, FIG. 2 is a partial plan view of a separator main body 2 structuring the separator 1 for the fuel battery, and FIG. 3 is a cross sectional view of a main portion along a line A-A in FIG. 1.

The fuel battery separator 1 in accordance with the first embodiment mentioned above has the separator main body 2 and a gasket 3 respectively as constituting parts, as shown in FIG. 1, and the constituting parts are structured as follows.

First, gasket forming grooves 10 and 11 are respectively formed in both surfaces 2a and 2b of the separator main body 2, in which a mixture of a carbon powder and a phenol corresponding to a thermosetting resin is compression molded, along an extending direction of a gasket as shown in FIG. 2, and a desired number of through holes 4 are formed along both the forming grooves 10 and 11 in such a manner as to communicate between bottom surfaces 10a and 11a of both the forming grooves 10 and 11. In this case, as shown in FIG. 3, in a groove width of the forming grooves 10 and 11 formed in both the surfaces 2a and 2b of the separator main body 2, a groove width D of one surface 2a is set larger than a groove width d of the other surface 2b. In particular, a rate (D/d) of the groove width of the forming groove is preferably 105% or more, and more preferably between 120 and 200%.

The gasket 3 is integrally provided with a buried portion 12 arranged within the forming groove 10 in one surface 2a side of the separator main body 2, a pedestal portion 5 supported to the buried portion 12 so as to protrude out of the forming groove 10, a lip seal portion 6 supported to the pedestal portion 5 and having a chevron cross sectional shape, a buried portion 13 arranged within the forming groove 11 in the other surface 2b side of the separator main body 2, a pedestal portion 7 supported to the buried portion 13 so as to protrude out of the forming groove 11, a lip seal portion 8 supported to the pedestal portion 7 and having a chevron cross sectional shape, and a connection portion 9 arranged in the through hole 4 and connecting both the buried portions 12 and 13.

Second Embodiment

Figure 4:
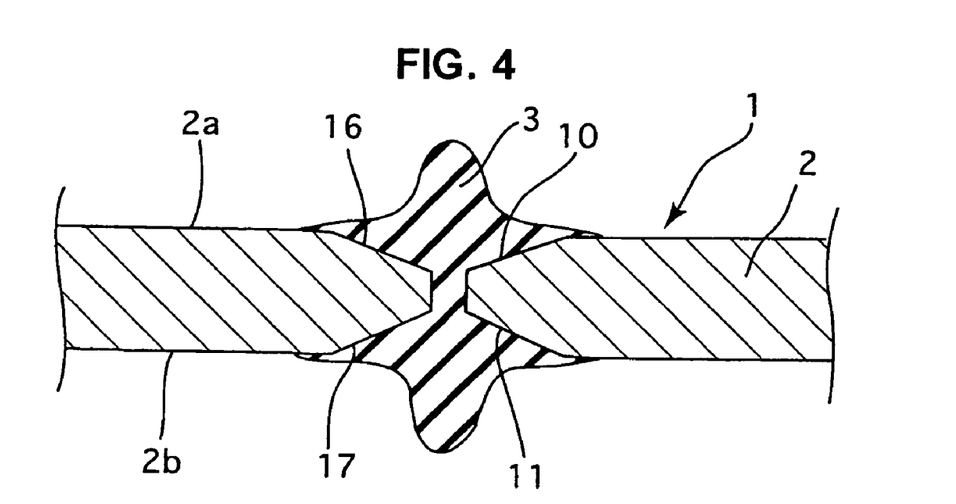
FIG. 4 is a cross sectional view of a main portion of a separator for a fuel battery in accordance with a second embodiment of the present invention.

FIG. 4 is a cross sectional view of a main portion of a separator 1 for a fuel battery in accordance with a second embodiment of the present invention. The fuel battery separator 1 in accordance with the second embodiment mentioned above has a separator main body 2 and a gasket 3 respectively as constituting parts, and the constituting parts are structured as follows.

First, gasket forming grooves 10 and 11 are respectively formed in both surfaces 2a and 2b of the separator main body 2, in which a mixture of a carbon powder and a phenol corresponding to a thermosetting resin is compression molded, along an extending direction of a gasket as shown in FIG. 2, and a desired number of through holes 4 are formed along both the forming grooves 10 and 11 in such a manner as to communicate between bottom surfaces of both the gasket forming grooves 10 and 11. In this case, as shown in FIG. 4, groove side surfaces 16 and 17 in the gasket forming grooves 10 and 11 formed in both the surfaces 2a and 2b of the separator main body 2 are formed in an inclined shape.

The gasket 3 is integrally provided with a buried portion 12 arranged within the forming groove 10 in one surface 2a side of the separator main body 2, a pedestal portion 5 supported to the buried portion 12 so as to protrude out of the forming groove 10, a lip seal portion 6 supported to the pedestal portion 5 and having a chevron cross sectional shape, a buried portion 13 arranged within the forming groove 11 in the other surface 2b side of the separator main body 2, a pedestal portion 7 supported to the buried portion 13 so as to protrude out of the forming groove 11, a lip seal portion 8 supported to the pedestal portion 7 and having a chevron cross sectional shape, and a connection portion 9 arranged in the through hole 4 and connecting both the buried portions 12 and 13.

Third Embodiment

Figure 5:
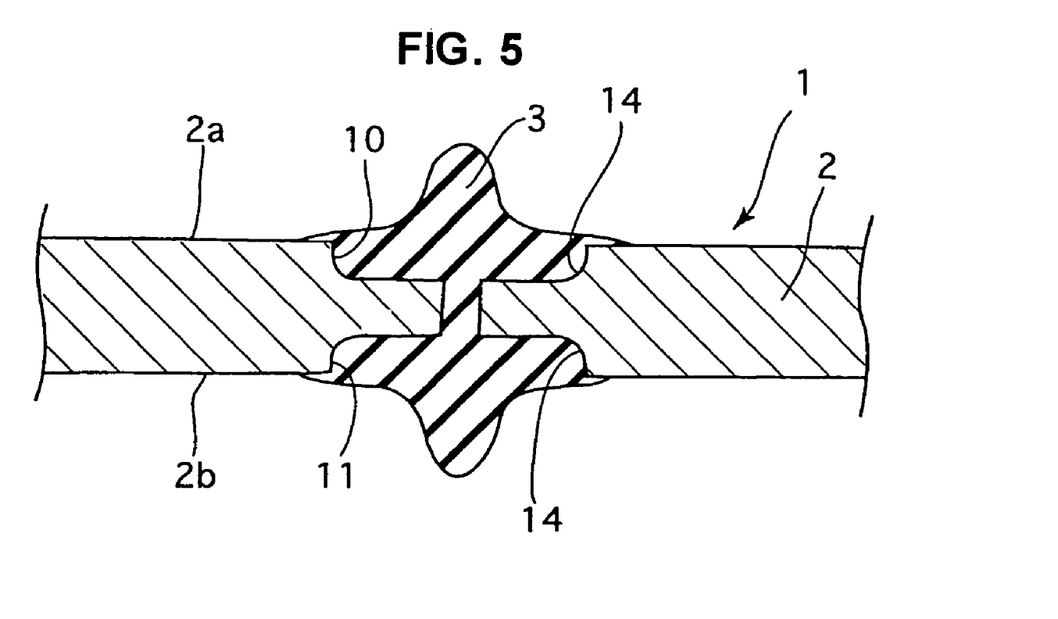
FIG. 5 is a cross sectional view of a main portion of a separator for a fuel battery in accordance with a third embodiment of the present invention.

FIG. 5 is a cross sectional view of a main portion of a separator 1 for a fuel battery in accordance with a third embodiment of the present invention. The fuel battery separator 1 in accordance with the third embodiment mentioned above has a separator main body 2 and a gasket 3 respectively as constituting parts, and the constituting parts are structured as follows.

First, gasket forming grooves 10 and 11 are respectively formed in both surfaces 2a and 2b of the separator main body 2, in which a mixture of a carbon powder and a phenol corresponding to a thermosetting resin is compression molded along an extending direction of a gasket as shown in FIG. 2, and a desired number of through holes 4 are formed along both the forming grooves 10 and 11 in such a manner as to communicate between bottom surfaces of both the forming grooves 10 and 11. In this case, as shown in FIG. 5, a curvature is provided in a groove bottom surface corner portion 14 in the gasket forming grooves 10 and 11 formed in both the surfaces 2a and 2b of the separator main body 2.

The gasket 3 is integrally provided with a buried portion 12 arranged within the forming groove in one surface 2a side of the separator main body 2, a pedestal portion 5 supported to the buried portion 12 so as to protrude out of the forming groove 10, a lip seal portion 6 supported to the pedestal portion 5 and having a chevron cross sectional shape, a buried portion 13 arranged within the forming groove 11 in the other surface 2b side of the separator main body 2, a pedestal portion 7 supported to the buried portion 13 so as to protrude out of the forming groove 11, a lip seal portion 8 supported to the pedestal portion 7 and having a chevron cross sectional shape, and a connection portion 9 arranged in the through hole 4 and connecting both the buried portions 12 and 13.

Fourth Embodiment

Figure 6:
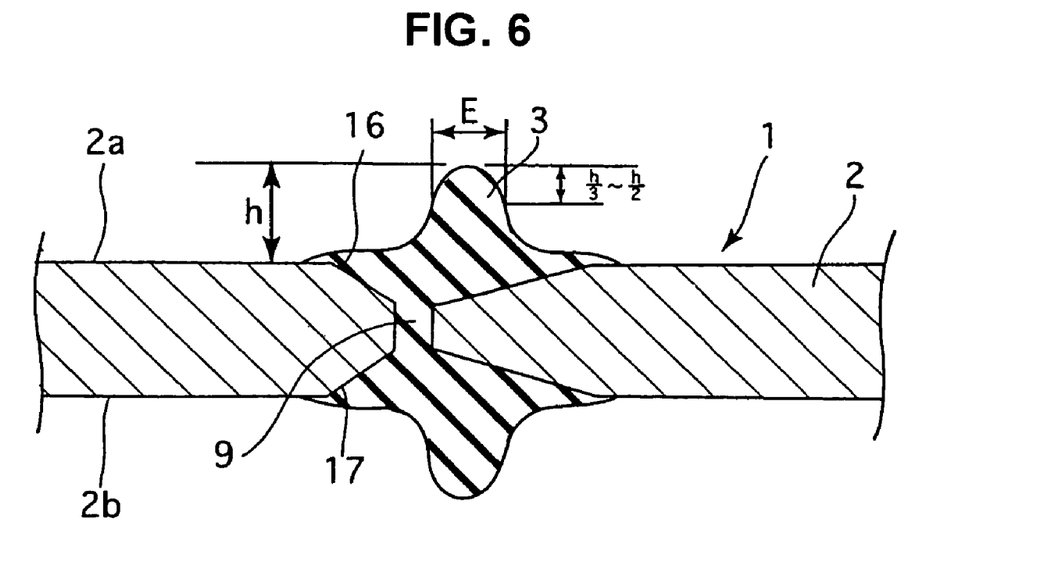
FIG. 6 is a cross sectional view of a main portion of a separator for a fuel battery in accordance with a fourth embodiment of the present invention.

In the first embodiment to the third embodiment mentioned above, there are exemplified the case that a position of the through hole and a position of the lip region contributing to a sealing performance of the gasket are overlapped. However, a fourth embodiment shows the case that a position of the through hole 4 and a position of a lip region E contributing to the sealing performance are arranged at offset positions. In this case, the "lip region E contributing to the sealing performance of the gasket" corresponds to a range between one third and one half of a height h of the seal lip 3. If a shrinkage is formed in a bottom side therefrom, the sealing performance is affected at a very small level. Accordingly, the lip region E is slightly smaller than an entire width of the lip 3.

Fifth Embodiment

Figure 7:
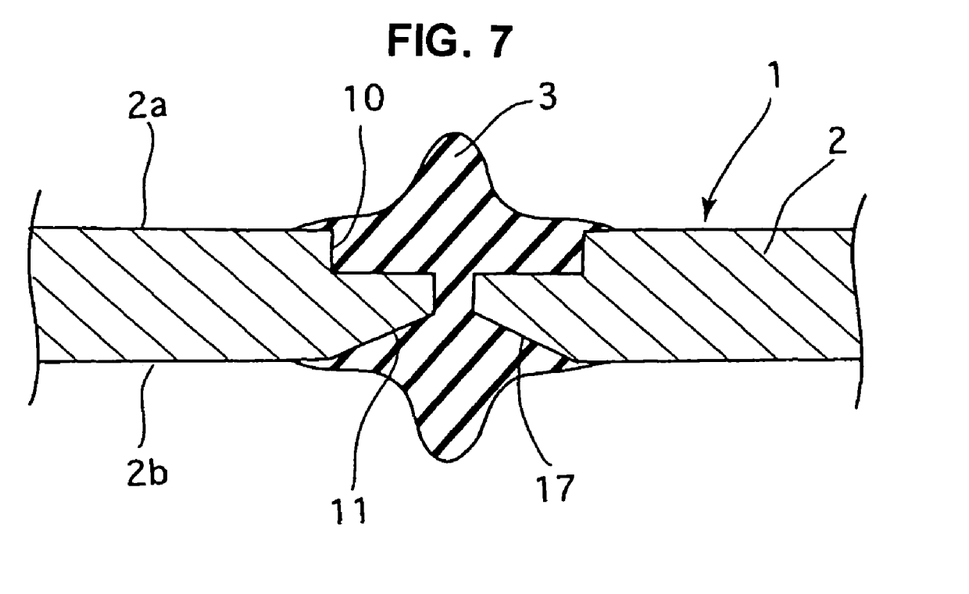
FIG. 7 is a cross sectional view of a main portion of a separator for a fuel battery in accordance with a fifth embodiment of the present invention.

Further, it is not necessary that the shape of the gasket forming groove 10 formed in one surface 2a is the same as the shape of the gasket forming groove 11 formed in the other surface 2b, and as in a fifth embodiment shown in FIG. 7, only a groove side surface 17 of the gasket forming groove 11 formed in the other surface 2b may be formed in an inclined shape.

Sixth Embodiment

Figure 8:
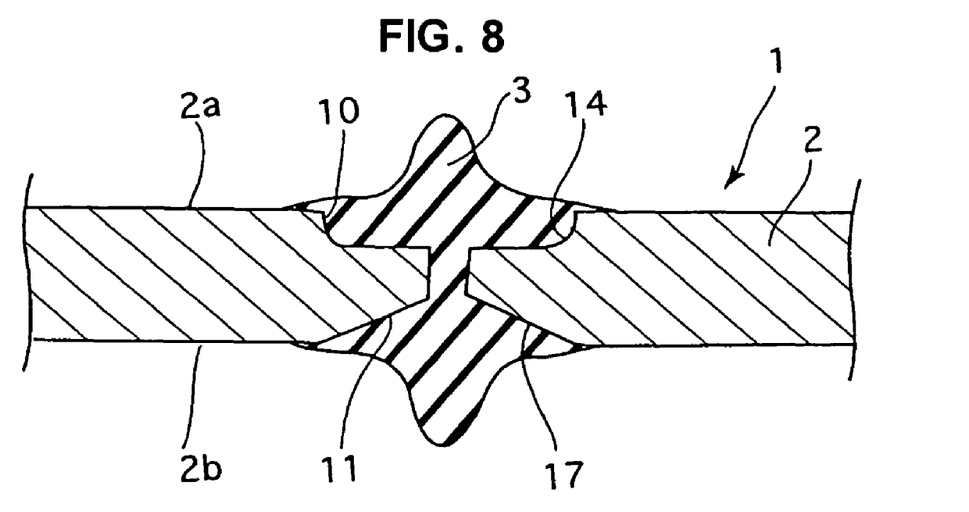
FIG. 8 is a cross sectional view of a main portion of a separator for a fuel battery in accordance with a sixth-embodiment of the present invention.

Further, it is not necessary that the shape of the gasket forming groove 10 formed in one surface 2a is the same as the shape of the gasket forming groove 11 formed in the other surface 2b in the same manner as the fifth embodiment, and as in a sixth embodiment shown in FIG. 8, there can be employed a case that the gasket forming groove 10 formed in one surface 2a is formed in a shape in which the curvature is provided in the groove bottom surface corner portion 14, and the gasket forming groove 11 formed in the other surface 2b has a groove side surface 17 in an inclined shape.

Seventh Embodiment

Figure 9:
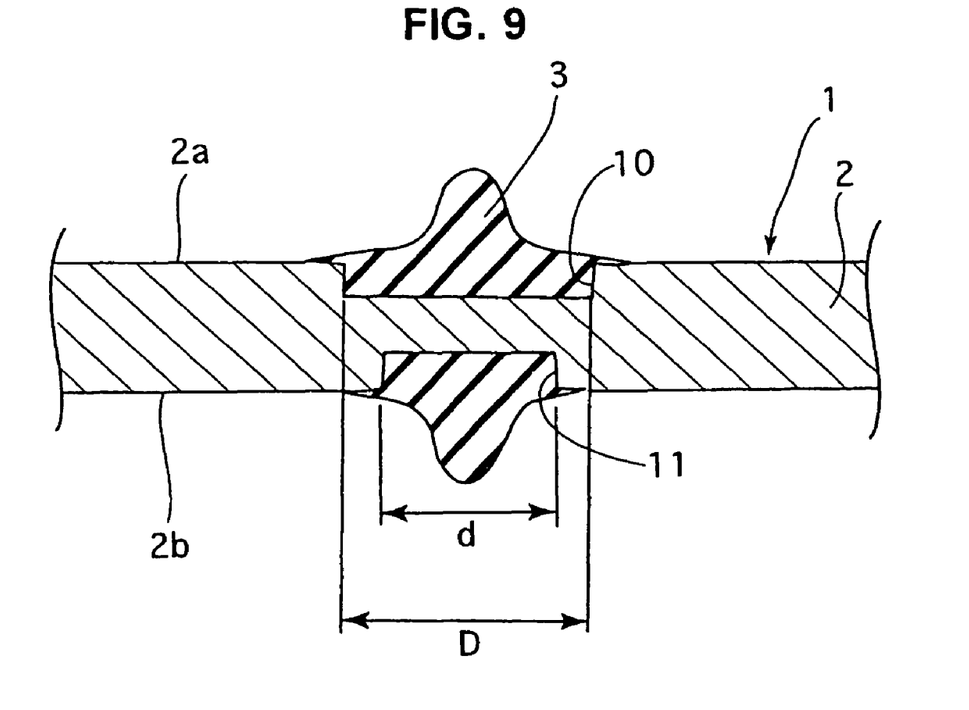
FIG. 9 is a cross sectional view of a main portion of a separator for a fuel battery in accordance with a seventh embodiment of the present invention.

FIG. 9 is a cross sectional view of a main portion of a separator 1 for a fuel battery in accordance with a seventh embodiment of the present invention, and shows a case that the through hole communicating the forming groove 10 formed in one surface 2a with the forming groove 11 formed in the other surface 2b is not formed.

In this case, a groove width D of the gasket forming groove 10 formed in one surface 2a is set larger than a groove width d of the forming groove 11 formed in the other surface 2b being the back of the forming groove 10. In particular, a rate (D/d) of the groove width of the forming grooves 10 and 11 is preferably 105% or more, and more preferably between 120 and 200%. In this case, the groove 11 formed in the other surface 2b is described as the forming groove, however, it may be employed to an adhesion groove or the like in place of the forming groove.

Embodiment 8

FIG. 10 is a cross sectional view of a main portion of a separator 1 for a fuel battery in accordance with an eighth embodiment of the present invention, and shows a case that the through hole is not formed in the same manner as the seventh embodiment, and shapes of groove side surfaces 16 and 17 in a gasket forming groove 10 formed in one surface 2a and in a forming groove 11 formed in the other surface 2b being the back of the gasket forming groove 10 are formed in an inclined shape. In this case, the groove 11 formed in the other surface 2b is described as the forming groove in the present embodiment, however, it may be employed to an adhesion groove or the like in place of the forming groove.

Ninth Embodiment

Figure 11:
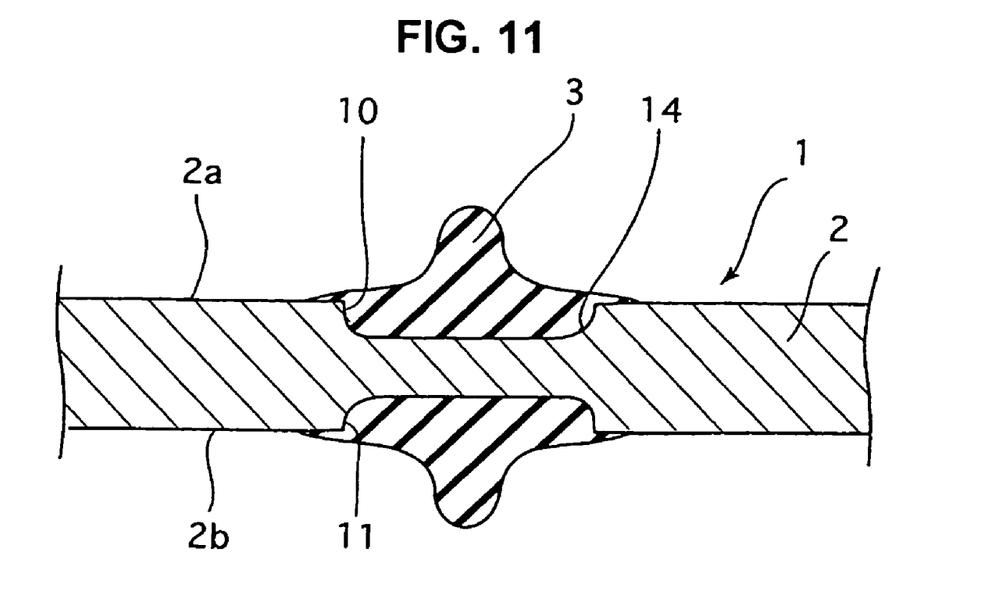
FIG. 11 is a cross sectional view of a main portion of a separator for a fuel battery in accordance with a ninth embodiment of the present invention.
Figure 12:
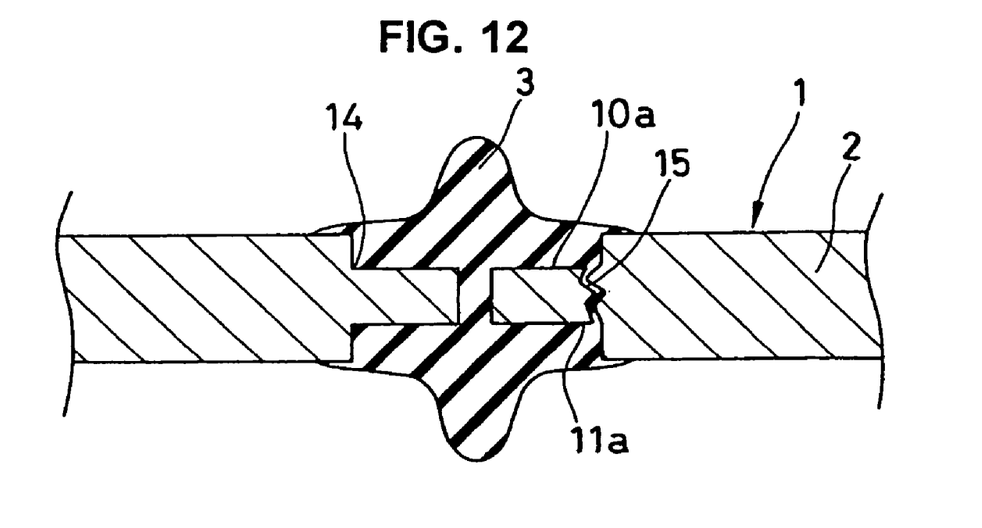
FIG. 12 is a cross sectional view of a main portion of a separator for a fuel battery in accordance with a conventional example.

FIG. 11 is a cross sectional view of a main portion of a separator 1 for a fuel battery in accordance with a ninth embodiment of the present invention, and shows a case that the through hole is not formed in the same manner as the seventh embodiment and the eighth embodiment. A curvature is provided in a groove bottom surface corner portion 14 in a gasket forming groove 10 formed in one surface 2a and in a forming groove 11 formed in the other surface 2b being the back of the gasket forming groove 10. In this case, the groove 11 formed in the other surface 2b is described as the forming groove in the present embodiment, however, it may be employed to an adhesion groove or the like in place of the forming groove.

In this case, the material used in the separator main body 2 in accordance with the first embodiment to the ninth embodiment may be a mixture of the carbon powder and a thermoplastic resin in addition to the mixture of the carbon powder and the thermosetting resin.

Further, as the integrally molding method by using the EPDM or the fluorine-contained rubber in the material of the gasket 3 in accordance with the first embodiment to the ninth embodiment, a transfer molding method may be employed in addition to the injection molding method.

What is claimed is:

1. A separator for a fuel battery comprising:

a separator main body of a mixture of a carbon powder and a thermosetting resin, a gasket made of a rubber material selected from an EPDM and a fluorine compound rubber and provided with lip portions on upper and lower surfaces;

said separator main body being provided with two opposed surfaces with each of said two opposed surfaces including gasket forming grooves, the gasket forming grooves of said two opposed surfaces being different in shape; and said gasket forming grooves being provided with a through hole;

said gasket being integrally formed in both surfaces of said separator main body by attaching said rubber material to said gasket forming grooves;

at least one of groove side surfaces in said gasket forming grooves formed in said separator main body being inclined downwardly to central parts of said grooves to form an inclined shape.

2. A separator for a fuel battery comprising:

a separator main body of a mixture of a carbon powder and a thermosetting resin, a gasket made of a rubber material selected from an EPDM and a fluorine compound rubber and provided with lip portions on upper and lower surfaces;

said separator main body being provided with two opposed surfaces with each of said two opposed surfaces including gasket forming grooves, the gasket forming grooves of said two opposed surfaces being different in shape; and said gasket forming grooves being provided with a through hole;

said gasket being integrally formed in both surfaces of said separator main body by attaching said rubber material to said gasket forming grooves; and a curvature being provided in corner portions of at least one of groove bottom surfaces in said gasket forming grooves formed in said separator main body.

* * * * *